US010994779B2

(12) United States Patent
Montag

(10) Patent No.: US 10,994,779 B2
(45) Date of Patent: *May 4, 2021

(54) TOW BEHIND STEERABLE CADDY TRAILER

(71) Applicant: Montag Investments, LLC, Emmetsburg, IA (US)

(72) Inventor: Roger A. Montag, Malcolm, NE (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,737

(22) Filed: Feb. 24, 2020

(65) Prior Publication Data

US 2020/0189659 A1    Jun. 18, 2020

Related U.S. Application Data

(63) Continuation of application No. 15/150,148, filed on May 9, 2016, now Pat. No. 10,569,803, which is a continuation of application No. 14/695,089, filed on Apr. 24, 2015, now Pat. No. 9,914,478, which is a continuation of application No. 12/964,299, filed on Dec. 9, 2010, now Pat. No. 9,022,409, which is a continuation of application No. 11/286,654, filed on Nov. 23, 2005, now Pat. No. 7,874,570.

(51) Int. Cl.
*B62D 13/00* (2006.01)
*B62D 13/04* (2006.01)
*B62D 63/06* (2006.01)

(52) U.S. Cl.
CPC ............. *B62D 13/04* (2013.01); *B62D 13/00* (2013.01); *B62D 63/062* (2013.01)

(58) Field of Classification Search
CPC ........ B62D 13/00; B62D 13/04; B62D 13/06; B62D 63/062; B62D 63/064; B62D 63/065
See application file for complete search history.

(56) References Cited

U.S. PATENT DOCUMENTS

| 808,440 | A | 12/1905 | Drew |
|---|---|---|---|
| 886,059 | A | 4/1908 | Jorstad |

(Continued)

FOREIGN PATENT DOCUMENTS

| CA | 2240791 A1 | 1/1999 |
|---|---|---|
| EP | 1336549 B1 | 3/2009 |

(Continued)

OTHER PUBLICATIONS

"Trailer Assembly", Hobart Brothers Company, pp. 1-18, Ohio 45373 (Apr. 1, 1998).

(Continued)

*Primary Examiner* — Kevin Hurley
*Assistant Examiner* — Maurice L Williams
(74) *Attorney, Agent, or Firm* — Goodhue, Coleman & Owens, P.C.

(57) ABSTRACT

A steerable caddy trailer is provided that has an improved structure including a main frame assembly, spindle assemblies attached to each end of the main frame for attachment of a wheel, a pair of swinging arms forwardly extending from the main frame and pivotally attached to the main frame, and tie rods connecting the swinging arms with the spindle assembly such that pivoting of the swinging arms steers the wheel.

19 Claims, 3 Drawing Sheets

(56) References Cited

U.S. PATENT DOCUMENTS

| | | |
|---|---|---|
| 917,457 A | 4/1909 | Kline |
| 1,222,666 A | 4/1917 | Porter |
| 1,378,436 A | 5/1921 | Achille |
| 1,379,982 A | 5/1921 | Hartsock |
| 1,600,635 A | 9/1926 | Ludvik |
| 1,618,094 A | 2/1927 | King |
| 1,811,798 A | 6/1931 | Lucke |
| 1,838,499 A | 12/1931 | Guy |
| 1,886,640 A | 11/1932 | Campbell |
| 1,894,194 A | 1/1933 | Elmer |
| 1,925,712 A | 9/1933 | Campbell |
| 1,999,748 A | 4/1935 | Ambrogio |
| 2,059,419 A | 11/1936 | Tuft |
| 2,092,683 A | 9/1937 | Stidham |
| 2,180,257 A | 11/1939 | Rollins |
| 2,431,626 A | 11/1947 | Townsend |
| 2,450,215 A | 9/1948 | Wilson |
| 2,457,397 A | 12/1948 | Richards |
| 2,485,853 A | 10/1949 | Willet |
| 2,559,142 A | 7/1951 | Woodworth |
| 2,559,487 A | 7/1951 | Whitlow |
| 2,579,118 A | 12/1951 | Land |
| 2,582,455 A | 1/1952 | Potter |
| 2,640,706 A | 6/1953 | Kuster |
| 2,885,218 A | 5/1959 | Cosley |
| 2,913,256 A | 11/1959 | Shame |
| 3,197,230 A | 7/1965 | Paul |
| 3,399,771 A | 9/1968 | Hryniowski |
| 3,430,975 A | 3/1969 | Wolf |
| 3,454,285 A | 7/1969 | Peursem |
| 3,690,698 A | 9/1972 | Humes |
| 3,695,628 A | 10/1972 | Fisher |
| 3,753,580 A | 8/1973 | Folkert |
| 3,880,439 A | 4/1975 | Wolter |
| 3,930,669 A | 1/1976 | Kollander et al. |
| 3,995,668 A | 12/1976 | Goodman |
| 4,024,985 A | 5/1977 | Iinoya et al. |
| 4,128,191 A | 12/1978 | Frase et al. |
| 4,147,373 A | 4/1979 | Cully |
| 4,171,825 A | 10/1979 | Woodell |
| 4,191,394 A | 3/1980 | Kasselmann |
| 4,208,063 A | 6/1980 | Baker et al. |
| 4,405,147 A | 9/1983 | Horsman et al. |
| 4,451,058 A | 5/1984 | Curry |
| 4,655,467 A | 4/1987 | Kitzmiller et al. |
| 4,720,119 A | 1/1988 | Ritter |
| 4,767,322 A | 8/1988 | Beckenbach et al. |
| 4,970,830 A | 11/1990 | Schlick |
| 5,244,226 A | 9/1993 | Bergh |
| 5,335,856 A | 8/1994 | Nathan |
| 5,364,117 A | 11/1994 | Keith |
| 5,382,041 A | 1/1995 | Keith |
| 5,492,351 A | 2/1996 | Salo |
| 5,529,316 A | 6/1996 | Mattila |
| 6,193,257 B1 | 2/2001 | Lutz |
| 6,520,521 B2 | 2/2003 | Mayfield |
| 7,188,850 B2 | 3/2007 | Ziech et al. |
| 7,311,446 B2 | 12/2007 | Koschinat |
| 7,350,795 B2 | 4/2008 | Svartz et al. |
| 7,810,832 B2 | 10/2010 | Montag |
| 7,874,570 B2 | 1/2011 | Montag |
| 8,117,646 B2 | 2/2012 | Lorsch |
| 9,022,409 B2 | 5/2015 | Montag |
| 2006/0125208 A1 | 6/2006 | Nejsum |
| 2007/0145713 A1 | 6/2007 | Montag |
| 2007/0176382 A1 | 8/2007 | Truchsess et al. |
| 2011/0079985 A1 | 4/2011 | Montag |

FOREIGN PATENT DOCUMENTS

| | | |
|---|---|---|
| GB | 695535 | 8/1953 |
| WO | 2004050457 A1 | 6/2004 |

OTHER PUBLICATIONS

"Trailer Kit", Hobart Brothers Company, p. 1-20 (Aug. 5, 1998).
"Trailer Running Gear", Hadco Engineering, Inc., pp. 1-58 (Jul. 30, 2001).

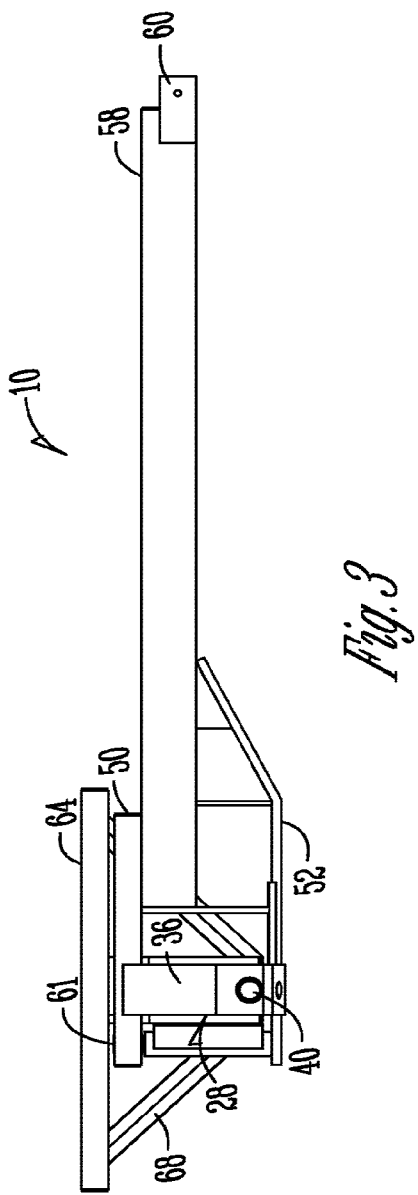
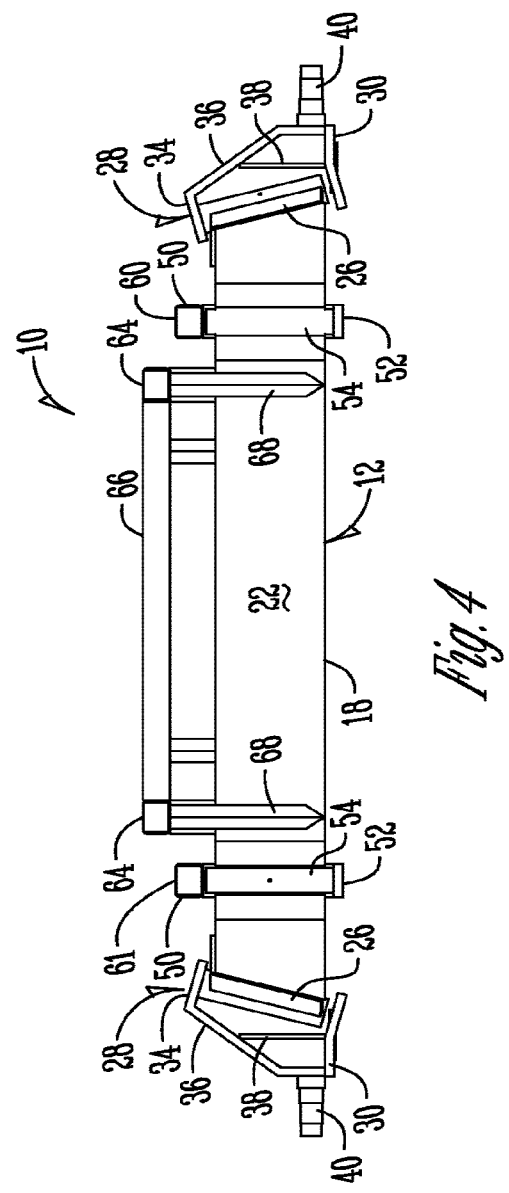

TOW BEHIND STEERABLE CADDY TRAILER

CROSS-REFERENCE TO RELATED APPLICATIONS

This is a Continuation of U.S. application Ser. No. 15/150,148 filed on May 9, 2016 now U.S. Pat. No. 10,569,803, which is a Continuation of U.S. application Ser. No. 14/695,089 filed on Apr. 24, 2015 now U.S. Pat. No. 9,914,478 issued on Mar. 13, 2018, which is a Continuation of U.S. application Ser. No. 12/964,299 filed Dec. 9, 2010 now U.S. Pat. No. 9,022,409 issued May 5, 2015, which is a Continuation of U.S. application Ser. No. 11/286,654 filed Nov. 23, 2005 now U.S. Pat. No. 7,874,570 issued Jan. 25, 2011, which the applications are hereby incorporated by reference in their entirety.

BACKGROUND OF THE INVENTION

The invention generally pertains to trailers and specifically to trailers designed for a tight turning radius.

Prior art trailers have been designed which provide a tight turning radius; however, these trailers use complicated structures to turn the trailer's wheels.

U.S. Pat. No. 1,600,635, issued to Isachsen on Sep. 21, 1926, shows an arrangement of a frame 11, and a steering rod 7 independent of the frame 11. The steering rod 7 is fastened to crank arm 3, then secured to a knuckle joint 4, and connected to a second knuckle joint 4' using arms 5 and a connecting bar 8. This complicated structure functions to turn the wheels 10.

U.S. Pat. No. 2,450,215 issued to Wilson on Sep. 28, 1948, uses multiple arms and steering links 29 and 14. This complicated structure functions to turn the wheels 14.

U.S. Pat. No. 2,092,683, issued to Stidham on September 1937, shows a non-conventional system using parallel cable 32 and a draw frame system 21. These two systems must operate together in order to turn the wheels 14.

The above-subject patents are all structures which function to permit the wheels to turn on stub axles. Unfortunately, each is a complicated structure and includes multiple moving parts.

Therefore, there is a need to produce a simplified structure with fewer moving parts to reduce costs associated with manufacturing, tooling and assembly.

Additionally, the complicated structures limit the amount of weight that may be placed upon them. Accordingly, it is a still further objective of the present invention to provide a trailer that may have a high maximum payload for hauling a great amount of weight associated with farm products such as spray tanks, fertilizer, and seed.

These and other objectives will become apparent from the following specification and drawings.

BRIEF SUMMARY OF THE INVENTION

The foregoing objectives may be achieved using a tow behind steerable caddy trailer having a main frame assembly having opposite ends, a wheel pivotally attached to each end of the main frame assembly, a pair of swinging arms pivotally attached to the main frame assembly and extending forward from the main frame. The swinging arms are spaced apart from one another such that each swinging arm is positioned adjacent a wheel. The swinging arms can be maintained parallel or non-parallel to one another. The trailer has a support structure attached to the main frame assembly that can support a platform, tank, hopper, etc. Additionally, it has been contemplated that tracks could be used in place of the wheels for supporting platforms, tanks and hoppers exceeding the weight limits for a wheel.

BRIEF DESCRIPTION OF THE DRAWINGS

FIG. 3 is a side view of the tow behind steerable caddy.
FIG. 4 is a rear view of the tow behind steerable caddy.

DETAILED DESCRIPTION OF THE PREFERRED EMBODIMENT

Figure 1:
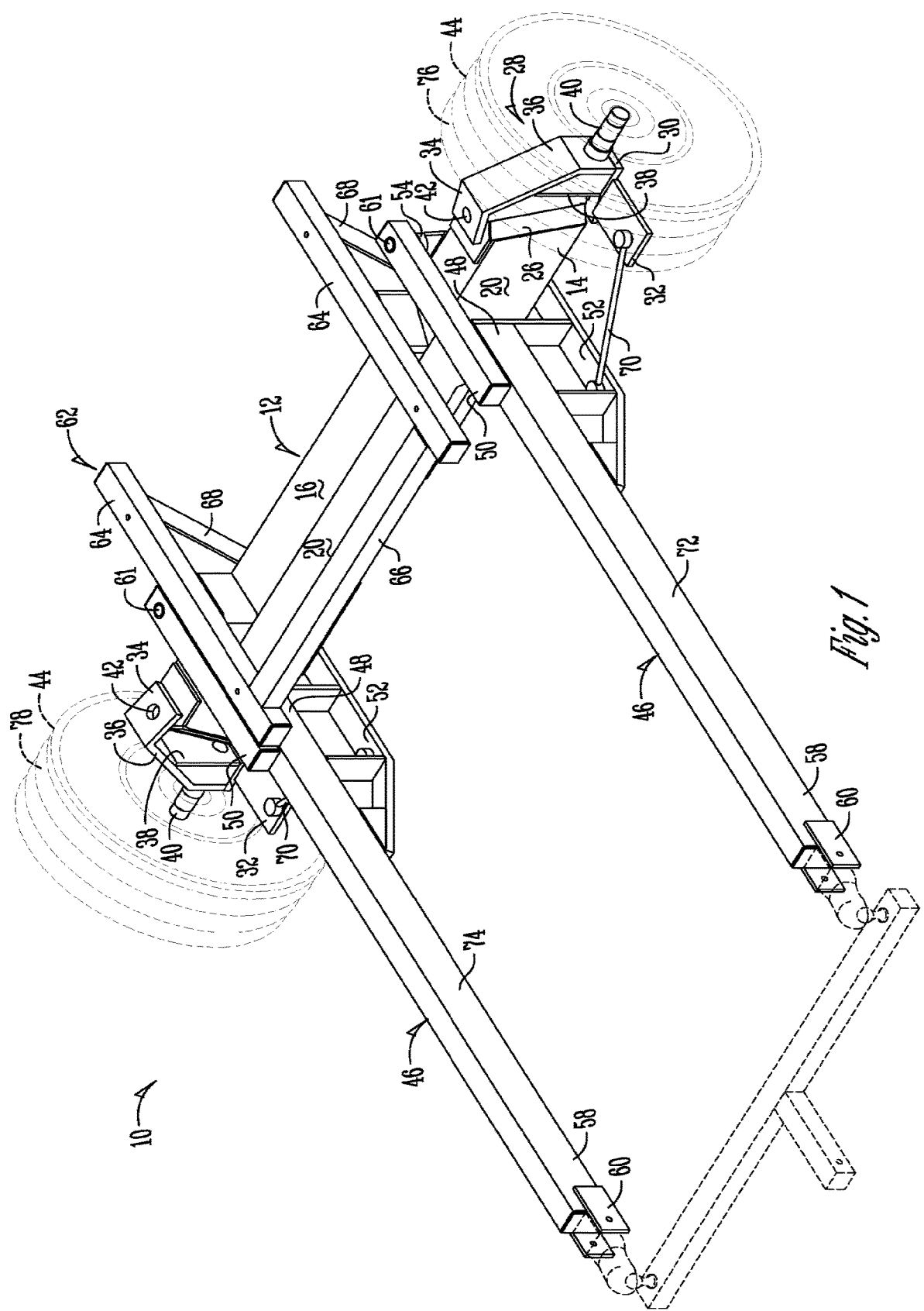
FIG. 1 is a perspective view of a tow behind steerable caddy.
Figure 2:
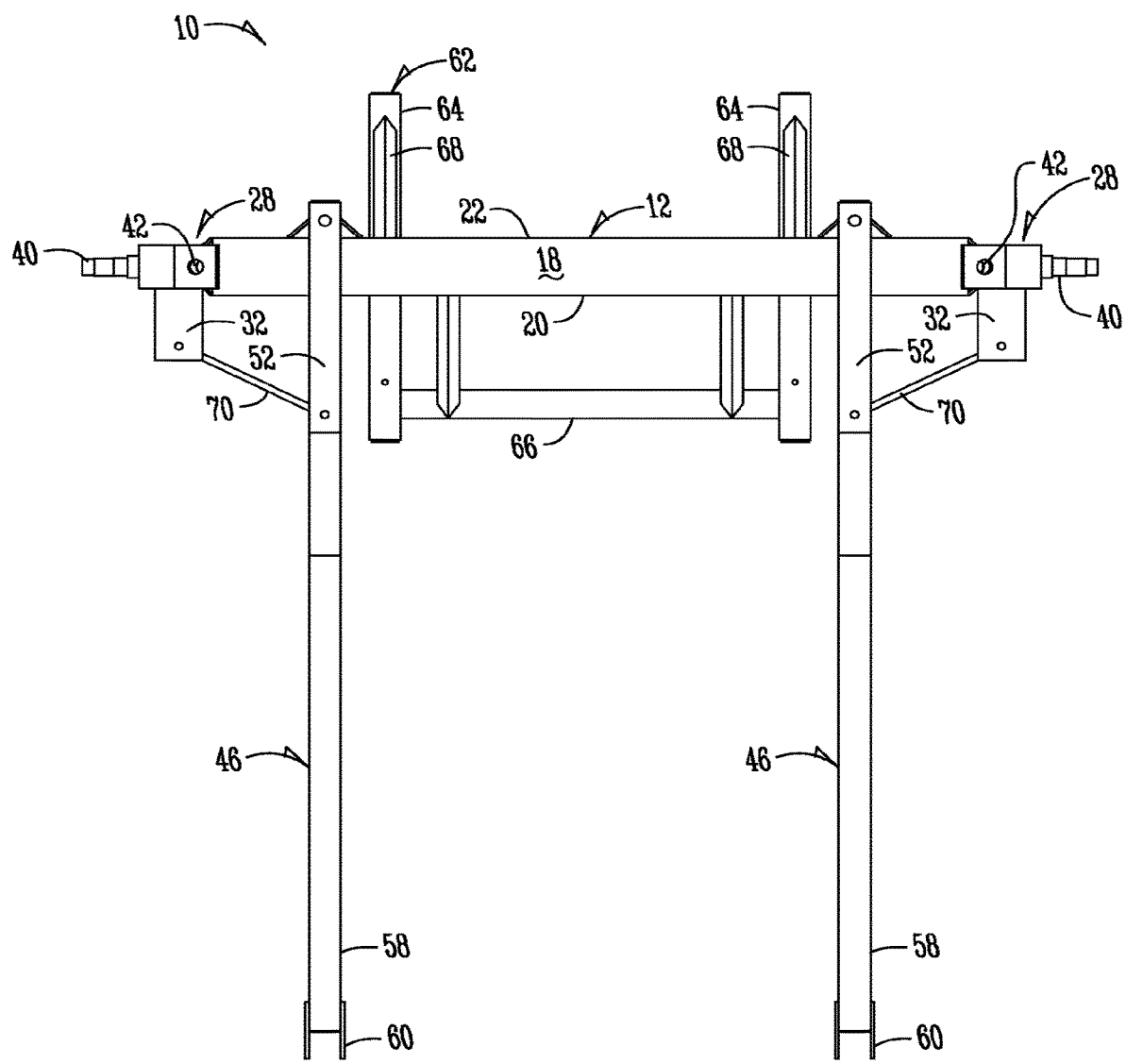
FIG. 2 is a top view of the tow behind steerable caddy.

With reference to FIGS. 1-4, numeral 10 refers to a tow behind steerable caddy. The tow behind steerable caddy trailer 10 is designed to follow behind a tractor, an implement pulled by a tractor, or other vehicle.

The trailer 10 is designed to follow in the tracks of the towing vehicle to navigate tight turning radiuses. The tow behind steerable caddy trailer 10 thus may negotiate tight turning radiuses in a field with very few end rows or with equipment that has a very narrow operating width.

The steerable caddy trailer 10 has a main frame assembly 12 illustrated as a metal square tube. The main frame assembly 12 has opposite ends 14, a top side 16, a bottom side 18, a front side 20, and a back side 22. Angled end caps 26 are attached at each end 14 of the main frame assembly 12. It has been contemplated that the end caps 26 could also be a vertical endcap rather than an angled endcap 26. A vertical endcap may be used in conjunction with a track or in applications requiring additional structural strength to support heavy loads.

A spindle assembly 28 is pivotally attached at each end 14 of the main frame assembly 12. The spindle assembly 28 has a base plate 30 and a top plate 34 connected by an angled extension 36 which ends in a vertical surface with a spindle 40 for a wheel 44. The base plate 30 and top plate 34 are attached to the angled end cap 26 by a pivot pin 42. The spindle assembly has a vertical support 38 which strengthens the connection of the base plate 30 and the top plate 34 to strengthen the spindle assembly 28.

A forward base member 32 is provided to extend from the base plate 30 and has a hole for connecting a first end of a tie rod 70.

Swinging arms 46 extend from the main frame assembly 12. Each swinging arm member 46 has a rear end 48 that pivotally attaches to the main frame assembly 12. The rear end 48 has a top support 50 and a bottom support 52, which extends above and below the main frame assembly 12 to pivotally attach to a cylinder 54 at the back side 22 of the main frame assembly 12 by a pivot pin 61. The bottom support 52 also has a hole for receiving a front end of tie rod 70. A front end 58 of the swinging arm members 46 has an adapter 60 for attaching to a rigid cross member, such as the exemplary rigid cross member shown in FIG. 1 in dashed lines. The rigid cross member could be a piece of square tubing (as shown). The rigid cross member could also be a bumper, a vehicle, a tractor or other farm implement. It is preferred that the swinging arm members 46 be pivotally mounted to a rigid cross member. For example, attaching a hitch to the adapter 60 and a ball to both ends of the rigid cross member (as shown in FIG. 1 in dashed lines) allows the swinging arm members 46 to pivot about the balls.

Similarly, swinging arm members 46 could also be pivotally attached to a bumper or another rigid cross member as part of a farm implement.

In FIG. 1, the swinging arm members 46 are shown parallel to each other and the tires 44 are shown perpendicular to the main frame assembly 12. However, the swinging arm members 46 need not be parallel to each other for the trailer 10 to steer. Adjusting the swinging arm members 46 affects the turning radius of the steerable caddy trailer 10. Regardless of the configuration, whether the swinging arm members 46 are parallel or moved inward closer to each other, the tie rods 70 can be adjusted to keep the tires perpendicular to the main frame assembly 12.

A platform support 62 is provided that has side supports 64 and a front support 66 connecting the two side supports 64 and sub-platform supports 68. The platform support 62 balances the weight of a platform, tank, hopper or other evenly towards the front and back of the main frame assembly 12.

In operation, the caddy is pulled behind the implement and/or vehicle by pivotally connecting the swinging arm members 46 to a rigid cross member. Should the towing vehicle or farm implement turn left this will simultaneously cause the left swinging arm 72 to shift rearward toward the main frame assembly 12 and the right swinging arm 74 to shift forward away from the main frame assembly 12. Shifting the left swinging arm 72 rearward towards the main frame assembly causes the tie-rod linkage 70 to move the spindle assembly such that the left wheel 76 steers right. Similarly, shifting the right swinging arm 74 forward away from the main frame assembly causes the tie-rod linkage 70 to move the spindle assembly such that the right wheel 78 steers right, also. Thus, when the towing vehicle turns left the wheels 44 on the steerable caddy 10 turn right so as to track the towing vehicle.

Should the towing vehicle or farm implement turn right this will simultaneously cause the left swinging arm 72 to shift forward away from the main frame assembly 12 and the right swinging arm 74 to shift rearward toward the main frame assembly 12. Shifting the left swinging arm 72 forward away from the main frame assembly causes the tie-rod linkage 70 to move the spindle assembly such that the left wheel 76 steers left. Similarly, shifting the right swinging arm 74 rearward toward the main frame assembly causes the tie-rod linkage 70 to move the spindle assembly such that the right wheel 78 steers left, also. Thus, when the towing vehicle turns left the wheels 44 on the steerable caddy 10 turn right so as to track the towing vehicle.

In either instance after the towing vehicle turns left or right and returns to driving a straight course, the wheels 44 return to a position perpendicular to the main frame assembly 12. In this fashion, the steerable caddy trailer is maintained in virtually the same turning radius as the vehicle and/or implement.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A steerable trailer, comprising:
    a main frame assembly having opposite ends terminating in wheels;
    a pair of swinging arms pivotally attached to the main frame assembly;
    each wheel connected to the adjacent swinging arm by a tie rod; and
    forward ends of the swinging arms attached to a towing implement;
    wherein actuation of the main frame for turning with the pair of swinging arms is based in part on a separation distance between the forward ends of the swinging arms;
    wherein the wheels are adjusted perpendicular to the main frame assembly by lengthening or shortening the tie rod.

2. The steerable trailer of claim 1, wherein a parallel configuration of the pair of swinging arms increases shifting of the main frame assembly compared to a non-parallel configuration of the pair of swinging arms.

3. The steerable trailer of claim 1, wherein a non-parallel configuration of the pair of swinging arms decreases shifting of the main frame assembly compared to a parallel configuration of the pair of swinging arms.

4. The steerable trailer of claim 1, further comprising a tow bar attached to the towing implement and forward ends of the pair of swinging arms.

5. The steerable trailer of claim 4, wherein the tow bar and the main frame assembly are parallel.

6. The steerable trailer of claim 1, further comprising:
    an angle of the pair of swinging arms relative to the main frame assembly, wherein the angle changes during turning.

7. The steerable trailer of claim 6, wherein the angle is generally unequal for each swinging arm during turning.

8. The steerable trailer of claim 6, wherein the angle is generally equal for each swinging arm when not turning.

9. The steerable trailer of claim 1, wherein the wheels are unparallel with the pair of swinging arms during turning.

10. A method for adjusting steering of a trailer, comprising:
    providing a pair of swinging arms each having a forward and rearward end, a main frame assembly having opposite ends terminating in wheels, the rearward end of each swinging arm pivotally attached at an angle relative to the main frame assembly, and a tie rod connected between each wheel the adjacent swinging arm;
    adjusting the amount of shifting forward and rearward of the terminal ends of the main frame assembly by changing the angle between each swinging arm and the main frame assembly;
    attaching the forward ends of the swinging arms to a towing implement at the angle between each swinging arm and the main frame assembly; and
    aligning the wheels perpendicular to the main frame assembly by lengthening or shortening the tie rod.

11. The method of claim 10, further comprising:
    increasing the amount of shifting of the main frame assembly for increasing turning by adjusting the angle between each swinging arm and the main frame assembly to generally 90 degrees from an acute or obtuse angle.

12. The method of claim 10, further comprising:
    decreasing the amount of shifting of the main frame assembly for decreasing turning by adjusting the angle between each swinging arm and the main frame assembly to less than 90 degrees from generally 90 degrees.

13. A method for steering a trailer, comprising:
    providing a main frame assembly having opposite ends terminating in a wheel, a pair of swinging arms pivotally attached at an angle relative to the main frame assembly, and a tie rod connected to the wheel and the adjacent swinging arm;

attaching forward ends of the swinging arms to a towing implement;

steering the wheels left and right by shifting the pair of swinging arms forward and rearward in opposite directions; and aligning the wheels perpendicular to the main frame assembly by lengthening or shortening the tie rod.

14. The method of claim 13, further comprising:

changing the angle between the pair of swinging arms and the main frame assembly equally and oppositely during steering.

15. The method of claim 13, further comprising:

steering the wheels to the right by shifting a right side of the main frame assembly forward and shifting a left side of the main frame assembly rearward.

16. The method of claim 13, further comprising:

steering the wheels to the left by steering the wheels to the left by shifting a left side of the main frame assembly forward and shifting a right side of the main frame assembly rearward.

17. The method of claim 13, further comprising:

steering the wheels straight forward by not shifting a left side of the main frame assembly and not shifting a right side of the main frame assembly.

18. The method of claim 13, further comprising:

connecting forward ends of the swinging arms closer together to decrease shifting.

19. The method of claim 13, further comprising:

connecting forward ends of the swinging arms farther apart to increase shifting.

* * * * *